United States Patent [19]

König et al.

[11] Patent Number: 4,756,785
[45] Date of Patent: Jul. 12, 1988

[54] PROCESS FOR THE PREPARATION OF ADHESIVES AND THEIR USE FOR THE FORMATION OF BONDS

[75] Inventors: Eberhard König, Floersheim; Robert Zöllner, Leverkusen; Uwe F. Gronemeier, Kuerton, all of Fed. Rep. of Germany

[73] Assignee: Bayer Aktiengesellschaft, Leverkusen, Fed. Rep. of Germany

[21] Appl. No.: 933,970

[22] Filed: Nov. 24, 1986

[30] Foreign Application Priority Data

Dec. 6, 1985 [DE] Fed. Rep. of Germany ....... 3543120

[51] Int. Cl.$^4$ ............................................... C09J 5/02
[52] U.S. Cl. ............................. 156/307.3; 156/331.4; 428/317.7; 528/44
[58] Field of Search ....................... 428/317.7; 528/44; 156/307.3, 331.4

[56] References Cited

U.S. PATENT DOCUMENTS

| | | | |
|---|---|---|---|
| 3,170,832 | 2/1965 | Wilson et al. | 156/307.3 |
| 3,228,820 | 1/1966 | Samson | 156/331.4 |
| 3,694,389 | 9/1972 | Levy | 528/44 |
| 4,137,366 | 1/1979 | Harada et al. | |

*Primary Examiner*—John J. Gallagher
*Attorney, Agent, or Firm*—Gene Harsh; Joseph C. Gil; Aron Preis

[57] ABSTRACT

The preparation and use of polyurethane-based hot melt adhesives which are cross-linked under the influence of heat comprising reacting (a) a polyisocyanate component containing at least one organic polyisocyanate with (b) a polyol component containing (b1) at least one organic polyhydroxyl compound having a hydroxyl number of 50 to 400 and optionally (b2) at least one organic polyhydroxyl compound having a hydroxyl number above 400 used in a quantity of 0 to 100 hydroxyl equivalents percent, based on component (b1), optionally with the addition of (c) auxiliary agents and additives conventionally used in polyurethane chemistry and/or the technology of adhesives is disclosed.

The reaction is characterized in that the equivalent ratio of isocynate groups of component (a) to all the isocyanate reactive groups present in component (b) is from 1:1 to 1.8:1, and in that component (b) further contains (b3) at least one organic compound containing a ketoxime group in an amount of 1 to 30% by weight, based on the total weight of component (b).

9 Claims, No Drawings

PROCESS FOR THE PREPARATION OF ADHESIVES AND THEIR USE FOR THE FORMATION OF BONDS

FIELD OF THE INVENTION

This invention relates to a new process for the preparation of thermoplastic, heat cross-linkable adhesives based on polyurethanes and to their use for bonding any substrates, in particular for bonding PVC sheets to rigid polyurethane foam panels.

SUMMARY OF THE INVENTION

The invention relates to a process for the preparation of polyurethane-based hot melt adhesives which can be cross-linked under the influence of heat. The process comprises reacting (a) a polyisocyanate component containing at least one organic polyisocyanate with (b) a polyol component containing (b1) at least one organic polyhydroxyl compound having a hydroxyl number of 50 to 400 and optionally (b2) at least one organic polyhydroxyl compound having a hydroxyl number above 400 used in a quantity of 0 to 100 hydroxyl equivalents percent, based on component b1), optionally with the addition of (c) auxiliary agents and additives (conventionally used) in polyurethane chemistry and/or the technology of adhesives, the reaction being characterized in that the equivalent ratio of isocyanate groups of component (a) to all the isocyanate reactive groups present in component (b) is maintained within the range of from 1:1 to 1.8:1, and in that component (b) further contains (b3) at least one organic compound containing a ketoxime group which is present in an amount of 1 to 30% by weight, based on the total weight of component (b).

The invention further relates to the use of the heat cross-linkable adhesives obtainable by the process according to the invention for the formation of bonds between any substrates, characterized in that at least one of the substrate surfaces which are to be bonded together is coated with a reaction mixture comprising components (a), (b) and optionally (c) and the substrate surfaces which are to be bonded together are then brought into contact at a temperature within the range of from 100° to 200° C., optionally with the application of pressure.

BACKGROUND OF THE INVENTION

The inner linings of motor vehicles, for example on the door panels or preassembled car roofs, are produced from heat molded rigid polyurethane foam panels. In this process, the interior furnishing layer, which is frequently a sheet of PVC, is preferably bonded to the heated foam panel during the molding process inside the appropriate shaped mold.

Solvent-free reactive adhesives, e.g. those based on polyurethanes, may be used for this purpose, but they have the disadvantage that their pot life determines the rhythm of the working cycle, apart from the fact that parts covered with wet adhesive are difficult to handle.

One method of overcoming the above-mentioned difficulties is described in U.S. Pat. No. 4,137,366, in which described are bonds produced by means of a hot melt adhesive film consisting of certain polyamide copolymers. One disadvantage of this hot melt adhesive is that it must be prepared from polymer combinations with a high softening temperature if the bonds obtained are to be heat resistant. The formation of bonds with such polymers requires prolonged heating of the part to be bonded at relatively high temperatures which are not always suitable for thermoplasts such as PVC. Moreover, heat resistance tests on these bonds show that the resistance is limited to 80° C., as will be seen from the examples, whereas heat resistances of up to 110° C. or higher are presently required in the motor car industry. It is therefore an object of the present invention to provide a new adhesive which would satisfy the following requirements:

The adhesives should be preparable by known methods from conventional starting materials of the kind hitherto used for the preparation of polyurethane adhesives.

The adhesive should enable highly heat-resistant bonds to be formed over a wide surface area.

The adhesive should be preparable and used solvent-free and have a pot life of at least 10 days after its preparation.

This problem has been solved by the process according to the invention as described below.

DETAILED DESCRIPTION OF THE INVENTION

The invention relates to a process for the preparation of polyurethane-based hot melt adhesives which can be cross-linked under the influence of heat. The process comprises reacting (a) a polyisocyanate component containing at least one organic polyisocyanate with (b) a polyol component containing (b1) at least one organic polyhydroxyl compound having a hydroxyl number of 50 to 400 and optionally (b2) at least one organic polyhydroxyl compound having a hydroxyl number above 400 used in a quantity of 0 to 100 hydroxyl equivalents percent, based on component (b1), optionally with the addition of (c) auxiliary agents and additives conventionally used in polyurethane chemistry and/or the technology of adhesives, the reaction being characterized in that the equivalent ratio of isocyanate groups of component (a) to all the isocyanate reactive groups present in component (b) is maintained within the range of from 1:1 to 1.8:1, and in that component (b) further comprises (b3) at least one organic compound containing a ketoxime group in an amount of 1 to 30% by weight, based on the total weight of component (b).

The invention further relates to the use of the heat cross-linkable adhesives obtainable by the process according to the invention for the formation of bonds between any substrates, characterized in that at least one of the substrate surfaces which are to be bonded together is coated with a reaction mixture comprising components (a), (b) and optionally (c) and the substrate surfaces which are to be bonded together are then brought into contact at a temperature within the range of from 100° to 200° C., optionally with the application of pressure.

The thermoplastic, heat cross-linkable hot melt adhesives according to the invention may be prepared by the reaction comprising (a) a polyisocyanate component with (b) a polyol component, optionally with the addition of (c) conventional auxiliary agents and additives.

The polyisocyanate component (a) may comprise any organic polyisocyanates or mixtures thereof although the usual aromatic polyisocyanates which are liquid at room temperature are preferred, e.g. 2,4- and/or 2,6-diisocyanatotoluene, liquid mixtures of 2,4'- and 4,4'-diisocyanatodiphenylmethane, 4,4-diisocyanatodiphenyl-methane which has been liquefied by partial carbodiimidization or urethanization of the isocyanate groups and in particular phosgenation products of aniline/formaldehyde condensates which are liquid at room temperature and contain higher homologues of 4,4'- and 2,4'- and optionally 2,2'-diisocyanatodiphenylmethane as well as containing the said diisocyanates themselves. Polyisocyanate mixtures of the diphenylmethane series, which are particularly suitable, preferably have a viscosity at 25° C. of about 20 to 250, in particular about 30 to 150 mPas.

Polyol component (b) is a mixture comprising (b1) organic polyhydroxyl compounds with a hydroxyl number from 50 to 400 of the kind known from polyurethane chemistry, (b2) 0-100 hydroxyl equivalents-%, preferably 10 to 30 hydroxyl equivalents-%, based on component (b1), of polyhydroxyl compounds with a hydroxyl number above 400 of the kind known from polyurethane chemistry, and (b3) any organic compound which has at least one ketoxime group and which apart from the ketoxime group is inert towards isocyanate groups.

The substances used as component (b1) are preferably the polyester polyols or polyether polyols or mixtures thereof known from polyurethane chemistry.

The polyester polyols used may be in particular straight chained polyester diols or slightly branched polyester polyols having a hydroxyl number in the range of 50 to 400, preferably 100 to 250, of the kind which may be prepared in known manner from dicarboxylic acids such as adipic acid, phthalic acid, hexahydrophthalic acid and polyhydric, in particular, dihydric alcohols such as ethylene glycol, diethylene glycol, 1,4-butane-diol, neopentyl glycol, 1,6-hexanediol or mixtures thereof, optionally with the addition of small quantities of higher functional polyols such as trimethylolpropane or glycerol. Polyester polyols based on higher hydric alcohols such as trimethylolpropane or glycerol, dibasic acids such as maleic acid, phthalic acid and adipic acid and monofunctional fatty acids such as oleic acid or stearic acid are also suitable in principle provided they conform to the above conditions concerning the hydroxyl number. The polyester polyols which may be used according to the invention as component (b1) or as part of component (b1) generally have a viscosity of 4000–40,000, preferably 4000 to 10,000 mPas at 25° C.

Suitable polyether polyols include in particular those having a hydroxyl functionality of 2 to 4 and a hydroxyl number of 50 to 400 preferably 100 to 250. These include polyether polyols used in polyurethane chemistry, of the kind which may be obtained by the alkoxylation of suitable starter molecules with propylene oxide and/or ethylene oxide. Suitable starter molecules are, for example, water, ethylene glycol, propylene glycol, glycerol, trimethylolpropane, N-methylamine, N-ethylamine, triethanolamine, ethylene diamine and any mixtures of such starter molecules. The alkoxylation products of starter molecules containing amine nitrogen are particularly suitable.

It is particularly preferred to use components (b1) which consist of mixtures of polyester polyols and polyether polyols of the type exemplified above in proportions by weight of polyester: polyether =5:1–1:1.

The optional component (b2), which may be included in quantities corresponding to 0 to 100 hydroxyl equvalents-%, preferably 10 to 30 hydroxyl equivalents-%, based on component (b1), are polyhydric alcohols having a hydroxyl number above 400, in particular those with a hydroxyl functionality of 2 to 4, or any mixtures of such polyhydric alcohols. Both simple polyhydric alcohols of the type mentioned above as examples of starter molecules for the polyether polyols and comparatively low molecular weight alkoxylation products of the starter molecules mentioned above as examples may be used, provided they conform to the aforesaid conditions concerning the hydroxyl number.

Component (b3) consists of any organic compounds containing at least one ketoxime group but is otherwise inert towards isocyanate groups.

It is preferred to use simple ketoximes such as may be obtained by the reaction of hydroxylamine with simple ketones. Any mixtures of such ketoximes may, of course, also be used. Typical examples of suitable ketoximes are: acetone oxime, butanone oxime, diethyl ketoxime, cyclohexanone oxime, acetophenone oxime and benzophenone oxime. Butanone oxime is particularly suitable as component (b3). Butanone oxime is particularly suitable as component (b3). Component (b3) is put into the process in a quantity of 1 to 30% by weight, preferably 5 to 20% by weight, based on the total weight of component (b).

Suitable auxiliary agents of additives (c) which are optionally used include, for example, known catalysts for the isocyanate polyaddition reaction, e.g. tertiary amines such as N,N-dimethylbenzylamine or N,N-dimethylethanolamine, lactams such as ε-caprolactam, basic inorganic salts such as potassium acetate or organic tin compounds such as dibutyl tin dilaurate or tin (II) octoate. Adhesifying resins of the type (known) per se may also be used as auxiliary agents or additives (c) although it is generally not necessary to use such resins.

For the process according to the invention, components (a), (b) and optionally (c) are reacted together in such proportions that the equivalent ratio of isocyanate groups of component (a) to hydroxyl groups of component (b) (including the hydroxyl groups of the oximes) is in the range of 1:1 to 1.8:1, preferably from 1:1 to 1.3:1. The above-mentioned reactants are mixed together and then reacted within the temperature range of from 10° to 100° C., preferably from 20° to 90° C., to form a thermoplastic, heat cross-linkable adhesive. This is preferably carried out by using a two-component spraying apparatus from which component (a) on the one hand and components (b) and (c) on the other are applied to at least one of the substrate surfaces which are to be bonded together to form a layer having a thickness of 100 to 500 μm and then causing the layer to react to form a thermoplastic film of adhesive at 10° to 100° C., for example in a drying channel. Such substrate surfaces covered with a thermoplastic adhesive may subsequently be combined with a second substrate surface optionally also coated with a layer of adhesive of the kind mentioned above and may be bonded thereto within the temperature range of 100° to 200° C., preferably 130° to 180° C., optionally with the application of pressure, with simultaneous cross-linking of the originally thermoplastic adhesive. In a preferred embodiment of this method according to the invention of forming a bond with the adhesives according to the invention, the surface of a substrate A is coated as described above and then joined on the side carrying the adhesive to a substrate B, optionally with the application of pressure, which substrate B is at a temperature in the range of 100° to 200° C., preferably 130° to 180° C., at least on that side which is to be bonded to substrate A. This method of forming bonds is particularly suitable for bonding synthetic resin sheets, in particular PVC sheets (substrate A) to foams, particularly rigid foam panels (substrate B). For this purpose, the reaction mixture is applied, for instance by spraying—as already described above—on a PVC sheet, for example having a width of 1.35 m, while the PVC sheet is moved forwards under the oscillating spray head at a speed of about 6 m/min. If the machine is operating at an output of 800 g/min of reaction mixture forming the polyurethane, a uniform film of adhesive is formed at an average rate of 100 g/m². After application of the reaction mixture, the coated PVC sheet is passed through a short drying channel, and after a further period of about 3 minutes, starting from the time of spraying, the sheet is found to be covered with a film of hot melt adhesive which is dry to the touch. The PVC sheet may then be cut up and is ready for further processing, optionally after a period of storage which may extend over several weeks. The PVC sheet may be worked up, for example, by stretching the sheet and placing it into the open mold designed to produce a particular molded part. The adhesive side of the PVC sheet is then covered with the foam panel which is at a temperature of about 180° C., the mold is pressed shut and the molded part, bonded to the PVC sheet, is then ready to be removed after about one minute.

The elevated temperature during the bonding process gives rise to an exothermic after-reaction in the layer of adhesive. This after-reaction initially softens the layer of adhesive and therefore improves wetting of the parts to be bonded and finally leads to cross-linking of the adhesive, which results in an elevation of glass transition temperature so that the adhesive bonds finally obtained have a high heat resistance.

The use according to the invention of adhesives obtained by the process according to the invention is, of course, not limited to the bonding of PVC sheets to rigid polyurethane foam panels but is suitable in principle for bonding any substrates which can normally be bonded with adhesives based on polyurethane, the term "any substrates" being understood to mean substrates which (a) can in principle be bonded with polyurethane adhesives and (b) are resistant to the elevated temperatures employed in the process.

The above-mentioned changes which the hot melt adhesives undergo under the action of heat, the exothermic after-reaction and the elevation in glass transition temperature after the first heating may be tested by the method of differential scanning calorimetry (DSC), as noted in the Examples.

The invention is further illustrated, but is not intended to be limited by the following examples in which all parts and percentages are by weight unless otherwise specified.

EXAMPLES

Example 1

(A) Formulation:
50 pbw of a polyester of adipic acid and neopentyl glycol, OH number 224, viscosity at 25° C. 6000 mPas
30 pbw of a propylene oxide polyether started on triethanolamine, OH number 148
20 pbw butanone oxime
2 pbw tin-II-bis-2-ethylhexanoate
102 pbw of the above polyol component, OH number of mixture 285, viscosity at 25° C. 250 mPas
80 pbw of a polyphenyl-polymethylene polyisocyanate (crude MDI), isocyanate content 31% by weight, viscosity at 25° C. about 130 mPas (B) Preparation and properties of the hot melt adhesive films 102 pbw of the polyol component described under (1A) and 80 pbw of the polyisocyanate described under (1A) are mixed together in a two-component high pressure piston machine and sprayed. The mixture has an NCO/OH equivalent ratio of 1.16. The high pressure piston machine is adjusted to an output of 800 g/min so that 448 g of polyol component and 350 g of isocyanate component are ejected per minute. The PUR components are sprayed on the back of a PVC furnishing sheet which is moved forward under the mixing head at a speed of about 6 m/min and the components spread out to form a uniform layer at a rate of about 100 g/min². The adhesive layer passes through a short drying channel (80° C.) and after a total reaction time of 3 minutes is sufficiently hardened to enable the PVC sheet to be cut and stacked. The coated PVC sheet may then be worked up into a bonded part either immediately after the process described above or after a storage time of several weeks.

The film of adhesive contains 11% by weight of butanone oxime. Its glass transition temperature determined by the method of differential scanning calorimetry (DSC) is 30° C. Other thermoanalytical measurements show that the adhesive when heated for the first time up to 130° C. shows a marked exothermic reaction beginning at this temperature the heat of reaction being 41.5 cal/g. By the end of this first heating stage, the glass transition temperature has risen to about 100° C.

(C) Properties of the bond, bond strength values:

A sandwich panel (dimensions in mm: 170×130×18) consisting of a deformable PUR rigid foam core and supporting layers of glass fleece is heated to 190° C. in a heating installation for 3 minutes. The panel which is now at a temperature of 190° C. is brought into contact with the side carrying hot melt adhesive (glass transition temperature 30° C.) of the PVC sheet and the two are molded together in a mold at room temperature for one minute to form a car roof. The bonded car roof is subjected to a climatic change test (95° C. 6 h, 42° C. 95% relative humidity 200 h, −38° C. 8 h). The strength of the bond between the PVC sheet and the support material is then tested. The PVC sheet is not found to become detached either at the edges or at the extreme indentations of the car roof.

Samples are cut out of the aged car roof at various regions and a tear-off strip 19 mm in width is peeled out at a forward feed rate of 100 mm/min and a tear-off angle of 45°. The strength of the bond is found to be so great in all the samples that the material of the PVC sheet tears (weight per surface area 700 g/m²).

Example 2

(A) Formulation:
50 pbw of a polyester of adipic acid and neopentyl glycol, OH number 224, viscosity at 25° C. 6000 mPas
20 pbw of a propylene oxide polyether started on triethanolamine, OH number 148

15 pbw of a propylene oxide polyether started on ethylene diamine, OH number 630
15 pbw butanone oxime
2 pbw tin-II-bis-ethylhexanoate
102 pbw of the above polyol component, OH number of mixture 330, viscosity at 25° C. 1050 mPas
90 pbw of a polyphenyl-polymethylene polyisocyanate (crude MDI), isocyanate content 32.5% by weight, viscosity at 25° C. about 30 mPas.

(B) Preparation and properties of the film of hot melt adhesive

The PUR components described under (2A) are sprayed on the back of a PVC web in the proportions by weight indicated above as in Example (1B).

The amounts of the polyol component and polyisocyanate component correspond to an NCO/OH equivalent ration of 1.15. The adhesive film contains 7.8% by weight of chemically incorporated butanone oxime. Its glass transition temperature is 57° C. During the first heating of the adhesive, an exothermic after-reaction producing heat in an amount of 10.7 cal/g takes place above 130° C.

(C) Properties of the bond, bond strength:

The PVC sheet coated with the above hot melt adhesive film (glass transition temperature 57° C.) is molded together with a hot PUR rigid foam panel as already described in Example 1C). The bond between the PVC sheet and the support material is tested by the climatic change test described in Example 1C).

No detachment of PVC sheet from support can be found in this test. Samples are removed from the aged molded part and from these samples a tear-off strip 19 mm in width is pealed out at a rate of 100 mm/min under a tear-off angle of 45° C. The forces required to tear the sheet off the samples are found to be 5 to 6 N.

Example 3

(A) Formulation:
102 pbw of the polyol component of Example 2
90 pbw of a polyphenyl-polymethylene-polyisocyanate (crude MDI), isocyanate content 32.5% by weight, viscosity at 25° C. about 50 mPas.

(B) Preparation and properties of the film of hot melt adhesives

The two PUR components described under (3A) are worked up by the method described in Example 1 in the proportions by weight indicated above.

The NCO/OH ratio is 1.15. The adhesive film contains 7.8% by weight of chemically incorporated butanone oxime. Its glass transition temperature is 48° C. During the first heating up stage of the adhesive, an exothermic after-reaction producing heat at 22.5 cal/g begins at 130° C. After this first heating up stage, the glass transition temperature has shifted to 80° C.

(C) Properties of the bond:

A PVC sheet coated with the adhesive described above (glass transition temperature 48° C.) is worked up as described in Example (1C) to form a molded part for the inner lining of a motor vehicle. This molded part is aged in the climatic test also described in Example 1. After this aging, the PVC sheet is not found to become detached from its support at any point.

Example 4

(A) Formulation:
40 pbw of a polyester of adipic acid and neopentyl glycol, OH number 224, viscosity at 25° C. 6000 mPas
15 pbw of a polyester of adipic acid, oleic acid and trimethylolpropane, OH number 370, viscosity at 25° C. 30,000 mPas
14 pbw of a propylene oxide polyether started on triethanolamine, OH number 148
20 pwb of butanone oxime
10.5 pbw of a short chained ethylene oxide polyether started on ethylamine, OH number 766
0.5 pbw of potassium acetate
100.0 pbw of the above polyol component, OH number of mixture 324, viscosity at 25° C. 330 mPas
90 pbw of the polyisocyanate of Example 2.

(B) Preparation and properties of the film of hot melt adhesive

The two PUR components described above are worked up to form a film of hot melt adhesive on a PVC interior furnishing sheet by the method described in Example 1. The amounts of the polyisocyanate and polyol component correspond to an NCO/OH equivalent ratio of 1.03. The film of hot melt adhesive contains 10.5% by weight of chemically incorporated butanone oxime. The glass transition temperature of the hot melt adhesive is 25° C. During the first heating up stage of the adhesive, an exothermic after-reaction producing heat at 16.6 cal/g takes place at temperatures starting from 130° C. After this first heating up stage, the glass transition temperature has risen to 70.5° C.

(C) Properties of the bond:

A PVC sheet covered with the adhesive described above is worked up as described in Example (1C) to form a molded part for the inner lining of a motor vehicle. This molded part is exposed to the climatic test described in Example 1. After this test, the PVC sheet is not found to be detached at any critical points, e.g. at the edge or at extreme curvatures. When attempts are made to strip the PVC sheet off by hand, the sheet breaks.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of polyurethane-based heat cross-linkable hot melt adhesives comprising reacting
    (a) at least one organic polyisocyanate with
    (b) a polyol component which comprises
        (b1) at least one organic polyhydroxyl compound having a hydroxyl number of 50 to 400 and optionally
        (b2) at least one organic polyhydroxyl compound having a hydroxyl number above 400 used in a quantity of 0 to 100 hydroxyl equivalents-%, based on component (b1),
which process is characterized in that the equivalent ratio of isocyanate groups of components (a) to all isocyanate reactive groups present in component (b) is maintained in the range of from 1:1 to 1.8:1 and in that component (b) further contains
        (b3) at least one organic compound having a ketoxime group in a quantity of 1 to 30% by weight based on the total weight of component (b) and being, apart from said ketoxime group, inert to isocyanate.

2. The process according to claim 1, wherein said component (b3) is at least one member selected from the group consisting of acetone oxime, butanone oxime, diethyl ketoxime, cyclohexanone oxime, acetophenone oxime and benzophenone oxime.

3. An adhesive prepared by the process of claim 1.

4. A method for bonding substrates comprising applying to a first substrate the adhesive of claim 3 and bringing said substrate in contact with a second substrate on the side carrying said adhesive at a temperature of from 100° to 200° C., optionally with the application of pressure.

5. The method of claim 4 wherein said first substrate is subjected to a temperature of from 10° to 100° C. after having been coated and before said contact with said second substrate.

6. The method of claim 4 wherein said temperature is about 130° to 180° C.

7. The method of claim 4 wherein said first substrate is of synthetic resin sheet material and said second substrate is a rigid polyurethane foam.

8. The method of claim 7 wherein said first substrate is a PVC foil.

9. The method of claim 4 wherein said second substrate is coated with said adhesive.

* * * * *